United States Patent [19]
Dillow

[11] 3,922,087
[45] Nov. 25, 1975

[54] MULTIPLE COPYING METHOD AND APPARATUS
[75] Inventor: Brian St. Pierre Dillow, Skarholmen, Sweden
[73] Assignee: Misomex Aktiebolag, Hagersten, Sweden
[22] Filed: Oct. 3, 1973
[21] Appl. No.: 403,207

[30] Foreign Application Priority Data
Oct. 6, 1972 Sweden.............................. 12981/72

[52] U.S. Cl.................................. 355/87; 355/91
[51] Int. Cl.².......................................... G03B 27/20
[58] Field of Search .............................. 355/91–94, 355/87

[56] References Cited
UNITED STATES PATENTS
3,658,014  4/1972  Kranz................................... 355/91

Primary Examiner—John M. Horan
Attorney, Agent, or Firm—James E. Nilles

[57] ABSTRACT

A light sensitive collection film is attached by adhesive suction to a resilient backing blanket which in turn is attached by adhesive suction and spot gluing to a rigid support. A transparent master film is attached by adhesive suction to a glass backing plate in a printing frame and is brought into uniform surface contact with the collection film by advancement of the printing frame. The suction forces holding the collection film and master film in place prevent spotty surface separation of the films due to surface irregularities of the glass plate.

8 Claims, 6 Drawing Figures

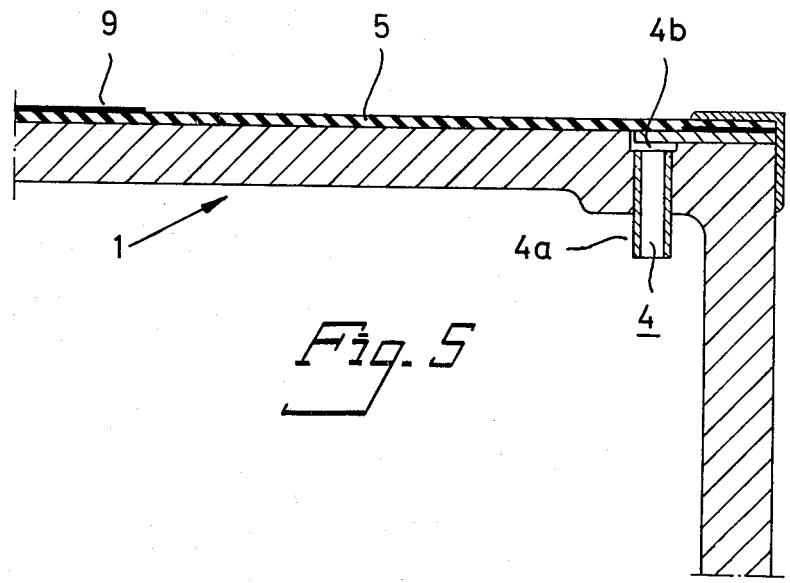
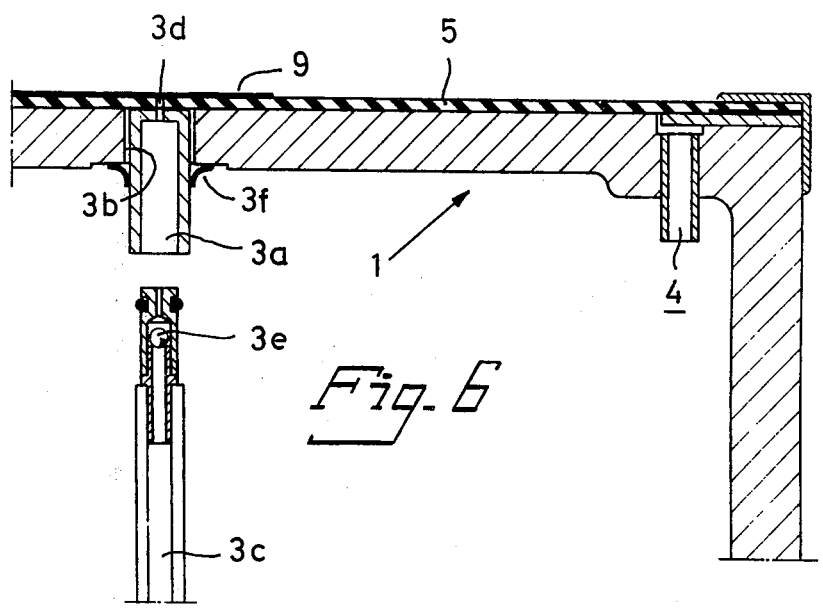

MULTIPLE COPYING METHOD AND APPARATUS

BACKGROUND OF THE INVENTION

The present invention relates to the multiple copying art, that is, to the copying of one or several different master films upon a light sensitive collection film.

The invention is particularly suitable for multiple copying in which great accuracy is necessary in the location of the part exposures on the collection base and in which an extremely good contact is necessary between the master film and the collection base in order to receive the best possible sharpness in the print on the collection base.

Multiple copying of this kind is frequently utilized for providing a negative or positive collection print which is later used for making further prints, printing plates, etc. Multiple copying is also used when copying directly down to a printing plate like an offset printing plate which after conventional treatment is used for directly providing printed copies.

In multiple copying operations there are often very great demands on the exactness in the location of the master film which is copied on the collection base, and for this purpose the master film is mounted in an exact position on the collection base, which may be a film or a plate, and after the master film has been brought into good contact with the collection film or plate it is copied down onto this. Following the exposure, the master film is moved to the next position on the collection film or collection plate, or another master film is mounted in an exactly intended position on the collection film or plate and a new exposure is made. When moving the master film or substituting the said master film it is extremely important that the collection film or plate is not moved from its position since the result will otherwise be imperfect register or wrongly located copies. To avoid such disadvantages the collection negative or the collection plate is generally solidly mounted on a support on which the film or plate is allowed to rest during all part-exposures, and the adjustment and location of the part-master-film takes place by means of an adjustable head having a printing frame which may be moved to an exact position over the collection base.

In order to obtain the best possible contact between the master film and the collection film or plate and in order to substantially partly equalize the unevennesses which are always present in the support on which the collection film is applied and in the contact glass of the printing frame the support is usually provided with a rubber blanket having a fabric base which is carefully mounted on the support and on which the collection film or plate is mounted prior to the copying. This is quite sufficient for many purposes, but in some cases of copying, in particular when copying part-master-films to a collection film, the rubber blanket is not capable of equalizing the small unevennesses which are inevitably present in the contact glass of the printing frame and this has as the effect that the two films at certain parts do not come into complete contact with each other, and at such parts there will be imperfect sharpness in the print. Especially when copying a fine half-tone screen this imperfect sharpness may become very noticeable and may lead to a bad print quality.

Consequently, there has been a demand for a method and an apparatus for multiple copying in which several part exposures are made of one and the same or several different transparent master films which are copied in several successive steps to a collection base having a light sensitive layer and in which the copings are made without any change of the position of the collection base during the copyings or between the various copying steps and in which practically all unevennesses both in the base of the apparatus and in the contact glass of the printing frame are equalized or compensated so that a good contact is obtained during the copyings between the master films and the collection base.

SUMMARY OF THE INVENTION

The present invention provides an improved multiple copying method and apparatus which overcome the heretofore encountered difficulties in placing the master film and the collection film into perfect or nearly perfect surface contact with each other. To that end the invention contemplates to attach the collection film by adhesive suction to a resilient backing blanket; to attach the backing blanket by combined spot gluing and adhesive suction to a rigid support; and to attach the master film by adhesive suction to the glass backing plate of the printing frame, the arrangement being such that the master and collection films will contact each other with the desired high degree of uniformity when the printing frame is brought into printing position.

These and other objects and advantages of the invention will become more fully apparent as this specification proceeds with reference to the accompanying drawings.

BRIEF DESCRIPTION OF THE DRAWINGS

FIGS. 5 and 6 are sectional views through a part of the support having an upper rubber blanket and showing two different types of the apparatus according to the invention.

DETAILED DESCRIPTION

Figure 1:
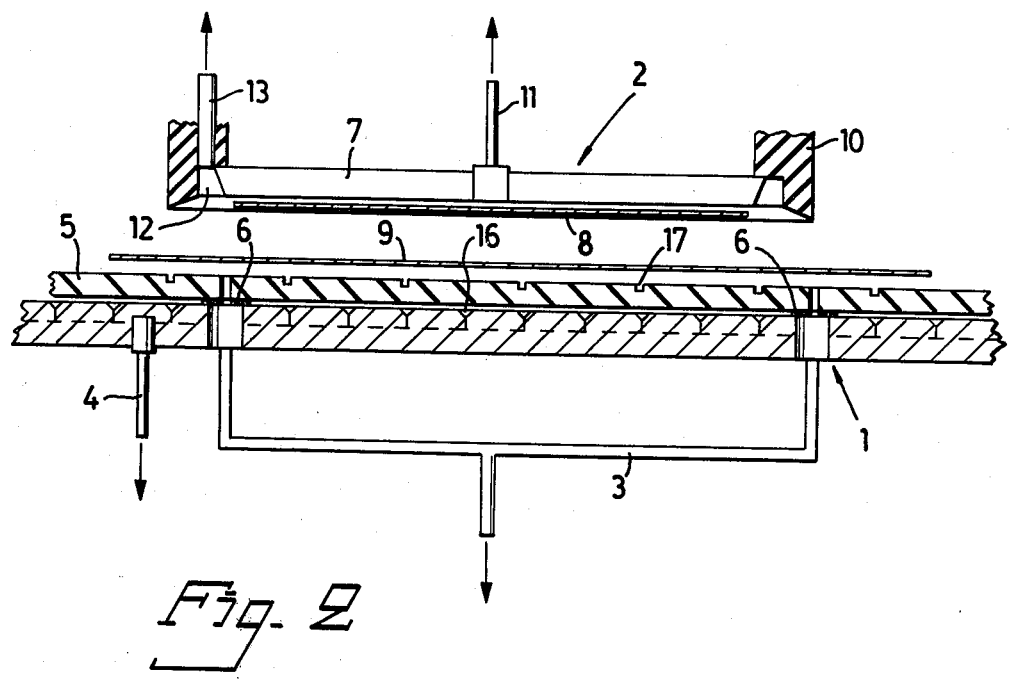
FIG. 1 is a diagrammatic showing of an apparatus according to the invention for performing multiple copying operations.

The apparatus according to FIG. 1 generally comprises a support 1 and a printing frame 2. The support is in the conventional way constructed of metal and it is provided with two different systems of air channels 3 and 4 respectively which will be further described in the following. As usual a rubber blanket 5 is mounted on the support, the blanket being of the kind which has a fabric base and which is used as an offset blank in offset printing machines. The rubber blanket 5 is attached to the base 1 at a number of suitably located points 6, and said attachment points 6 may be small patches of glue. Between the attachment points 6 there is no fixed connection between the rubber blanket 5 and the support 1.

The printing frame 2 comprises a contact glass 7 and a seating rim 10 surrounding the contact glass. On the underside of the contact glass 7 a master film 8 may be mounted, and when so mounted, said master film 8 may be forced against a collection film or collection plate 9 attached to the rubber blanket 5. The sealing rim 10 around the contact glass 7 is made of rubber, and the printing frame is in the usual way further provided with lighting means (not shown in the drawings). For the mounting of the master film 8 on the contact glass 7 this may be provided with a connection socket 11 for vacuum so that the master film 8 may be kept against the contact glass 7 by adhesive suction. Between the contact glass 7 and the sealing rim 10 a continuous groove 12 extends round the printing frame, which groove is connected to an evacuating source (not shown) over a tube 13 so that upon lowering of the printing frame the latter will be sucked against the rubber blanket 5 and against the collection film 9 thereon.

Figure 2:
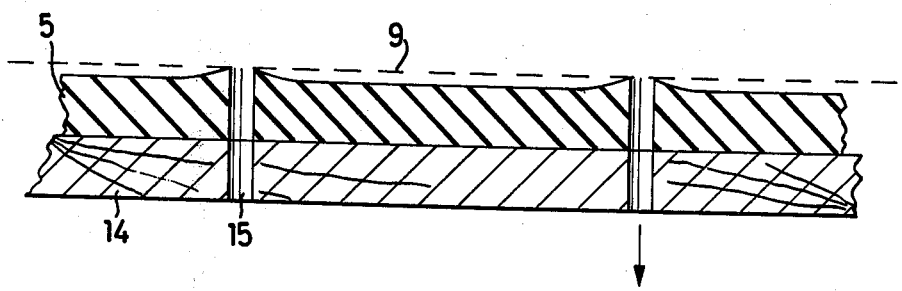
FIG. 2 is a sectional view of a part of a prior art multiple copying apparatus.

In order to obtain a rubber blanket which is dimensionally fixed and as even as possible the rubber blanket was according to a previously known practice mounted on a plate of any stiff material like a wood fibre plate 14 as shown in FIG. 2, and this unit of rubber blanket and wood fibre plate used to be mounted in a fixed position on the support 1. When mounting the collection film 9 on the unit of rubber blanket and wood fibre plate the rubber blanket used to be provided with suitably positioned scratched grooves which via channels 15 are connected to a source of subatmospheric pressure. The collection film 9 is in this way attached to the rubber blanket by adhesive suction. It has however been shown that the scratched grooves present somewhat raised edges as much exaggerated shown in FIG. 2, and the said raised edges make a complete contact between the master film and the collection film difficult or even impossible as indicated by the broken line 9 in FIG. 2. Also this previously employed practice is not capable of equalizing the unevennesses of the contact glass surface which are often very small, and therefore lack of contact and consequent lack of sharpness may occur between the master film 8 and the collection film 9.

In order to avoid the above mentioned problem the rubber blanket 5 is according to the present invention mounted without the aid of any stiffening means directly on the support 1 preferably by means of the above mentioned small glue patches 6, and the rubber blanket is thereby fixed to the support only at certain points. In order to obtain a mounting of the rubber blanket also between the small glue patches the support 1 is provided with a system of air channels 4 which are branched into several grooves 16 of small width and depth recessed into the upper surface of the support table 1. The system of air channels and the grooves 16 may be put under vacuum, whereby the rubber blanket 5 is attached by adhesive suction to the upper surface of the support between the attachment points 16, so that the rubber blanket as a whole is kept in an exact position on the support.

According to a simple embodiment of the invention which is shown in FIG. 5, the rubber blanket 5 is attached to the support table 1 only along the periphery thereof by means of glue or in any other suitable way, while the remaining part of the rubber blanket is freely movable in relation to the support. In this case the air channel 4 comprises one or more vacuum connection sockets 4a and an air channel 4b extending round the support table 1 inside the attachment line between the rubber blanket and the support. Preferably the rubber blanket 5 is porous so that the vacuum from the air channel 4 is acting through the foramina of the rubber blanket 5 both to keep the rubber blanket 5 against the support 1 and to keep the collection film 9 against the rubber blanket 5. The connection between the rubber blanket and the support may alternatively be established by means of double sided adhesive tape, and preferably an air type frame is mounted around the periphery of the support 1 and the blanket 5.

In the embodiment of the invention shown in FIG. 6 the rubber blanket 5 is likewise attached to the support 1 only along the periphery thereof by means of glue, double-sided adhesive tape, etc. In this embodiment the rubber blanket 5 may be of the air tight type and the only purpose of the air channel system 4 is to keep the rubber blanket 5 attached to the support 1. Except for the attachment line along the periphery of the support 1 the rubber blanket 5 is freely movable in relation to the support 1, and in order to keep the collection film attached to the rubber blanket there is provided a number of socket connections 3a which are glued or in any other suitable way attached to the underside of the rubber blanket 5. The socket 3a is freely movable a limited distance in the radial direction with a bore 3b in the support and it is freely movable in the axial direction together with the rubber blanket. A vacuum hose connection 3c is provided for air tight connection to the socket 3a, and the vacuum is distributed along the upper surface of the blanket via a bore 3d extending through the rubber blanket 5. Preferably the hose connection 3c is provided with a check valve 3e, the purpose of which is to block the air channel system 3 in case there is a stronger vacuum acting from the upper side of the rubber blanket 5. In order to eliminate the risk that the vacuum emanating from the air channel system 4 is dissipated due to air entering between the socket 3a and the bore 3b there is provided a sealing 3f like a rubber washer acting between the socket 3a and the underside of the support table 1.

Like in the hereinbefore disclosed embodiments the rubber blanket in FIG. 6 may on the upper surface thereof be provided with grooves 17 communicating with the system 3 of air channels extending through the blanket. The grooves 17 may be of small width and depth and in a practical embodiment of the invention the grooves have a width of 0.35 mm and a depth of 1.0 mm.

Thus in the shown and described apparatus there are four different systems of vacuum, two systems in the support and two systems in the printing frame. It is very essential for the invention that the different systems of vacuum are acting at different pressure levels. The evacuating system 3 which is distributing vacuum along the grooves 17 and which is keeping the collection film attached to the rubber blanket 5 shall produce a strong vacuum while the evacuating system 4 which is keeping the rubber blanket 5 against the support 1 between the attachment points shall produce a substantially weaker vacuum. The vacuum system which is formed by the channel 12 between the contact glass 7 and the sealing rim 10 shall produce a strong vacuum and preferably about the same vacuum as in the air channel system 3 of the support. The subatmospheric pressure of the vacuum socket 11 must be strong enough to keep the master film 8 safely sucked against the contact glass 7 but the subatmospheric pressure need not necessarily be as strong as in the channels 3 and 12. Practical tests have shown that the difference in subatmospheric pressures between channels 3 and 12 on one side and channels 4 on the other side may be 40% of vacuum and in a tested embodiment of the invention the channels 3 and 12 were supplied with a vacuum of 80% while the vacuum in channels 4 was kept at 40%. The magnitude of subatmospheric pressure in the channels 3 and 12 may be adjusted according to need but it has been found satisfactory to keep the difference of subatmospheric pressure between the different systems at 40%, that is, to give the system of air channels 4 a subatmospheric pressure of 30% in case the subatmospheric pressure in the system of channels 3 and 12 is given a subatmospheric pressure of for instance 70%, etc.

Figure 3:
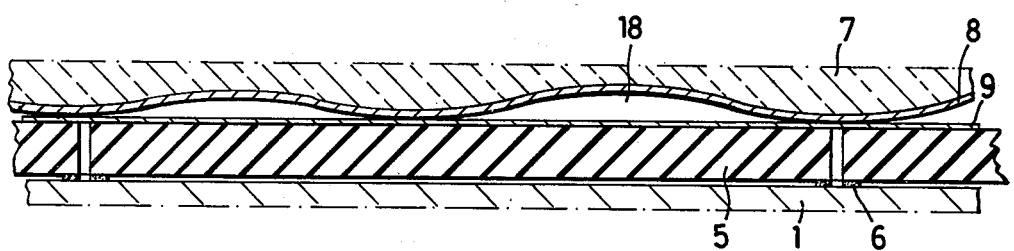
FIGS. 3 and 4 are sectional views showing two different situations which may be incurred in the operation of the apparatus shown in FIG. 1.
Figure 4:
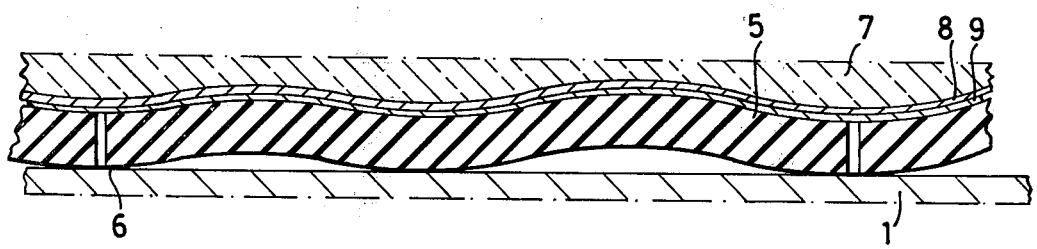

The aim of keeping different values of subatmospheric pressure in the different systems of air channels will be explained in connection with FIGS. 3 and 4. When copying a master film 8 down to a collection film 9 the master film 8 is sucked against the underside of the contact glass 7, and the collection film 9 is sucked against the rubber blanket 5 by putting the system 3 of air channels under strong vacuum. At the same time as putting the air channel system 3 under strong vacuum the air channel system 4 is put under a weaker vacuum, and the support table 1 and the rubber blanket 5 and the collection film 9 become a strongly interconnected unit. The printing frame 2 is lowered against the support 1, and when doing so the case may occur which is illustrated in FIG. 3. In the figure the contact glass 7 is shown to have strongly exaggerated unevennesses. The master film 8 is kept in good contact with the contact glass due to its elastic properties while the collection film 9 is sucked into good contact with the rubber blanket 5. When the contact glass 7 with the master film 8 comes into contact with the rubber blanket 5 and the collection film 9 there will be small air channels 18 between the master film 8 and the collection film 9, which air channels 18 correspond to the lower or thinner parts on the lower surface of the contact glass. Since there is no good contact between the master film 8 and the collection film 9 there cannot be any exact sharpness in the print either.

In this situation the air channel 12 in the printing frame is however put under strong vacuum and preferably the same vacuum as in the air channel system 3, whereby a strong vacuum develops between the printing frame bordered by the sealing rim 10 and the collection film 9. The collection film 9 is by strong vacuum sucked against the rubber blanket 5 and it is therefore keeping its condition of good contact with the rubber blanket. The rubber blanket in turn is kept fixed at the attachment points like points 6 in the apparatus according to FIG. 1, but between the attachment points the rubber blanket is sucked against the support table by a vacuum which is weaker than the vacuum acting from above through channels 12. Therefore, since the vacuum acting from above is stronger than the vacuum acting from underneath the rubber blanket will be released from the support table 1 together with the collection film 9 at those places between the attachment points which correspond to the lower parts of the contact glass 7, and the rubber blanket together with the collection film 9 will be forced into good contact with the master film 8 and the contact glass 7 also at the lower parts thereof. When a good contact has been obtained in this way between the master film 8 and the collection film 9 exposure takes place in the conventional way, and then the channel 12 is put under atmospheric pressure, whereby the rubber blanket with the collection film 9 is once again sucked against the support in exactly the same position as before the exposure. Thereafter the master film is exchanged and/or the printing frame is moved to another copy position at which another exposure takes place on the collection film 9. The situation at exposure is shown in FIG. 4.

By the method and the apparatus according to the invention the prior art principle of butt and stiff mounting of the rubber blanket on the support has been discarded, and in turn there is provided such a pliability in the action of the rubber blanket that this may be brought to conform with the unevennesses of the contact glass 7 in the printing frame 2. This is possible without any risk that the rubber blanket is moved out of its correct mounting position, which exact position is kept both due to the action of the attachment points and due to the action of the weak vacuum in the air channel system 4 and the grooves 16. By means of the method and apparatus according to the invention an extremely good sharpness is obtained while keeping such an exact register that even double exposures may be made on the collection film 9 without a risk of imperfect register. A further advantage of the invention is that the printing may be made by means of a printing frame which is large enough to extend beyond the collection film which printing procedure has normally not been possible with prior art methods but may be of importance from an economical viewpoint in that it is no longer necessary to use a larger collection film than would otherwise have been necessary.

Although the invention has been described herein in connection with the printing of a number of master films onto a collection film having a light sensitive layer, the invention may obviously be utilized in other technical fields and for printing master films or master set-ups directly upon an offset plate, an intaglio plate, an electro type or other surface.

I claim:

1. Apparatus for multiple copying in which several part exposures are made on a light sensitive base comprising, a support having a rubber blanket mounted thereon; a printing frame mounted above said support and movable vertically with respect to said support; means for attaching a master film to said printing frame by applying subatmospheric pressure thereto; said rubber blanket being attached to said support at spaced attachment points; and means for attaching the rubber blanket by adhesive suction to the support between said attachment points.

2. Apparatus according to claim 1 and further comprising means for attaching a collection film to said rubber blanket, said last named means comprising a system of vacuum channels on the upper surface of said rubber blanket and connection sockets for such vacuum channels extending through said rubber blanket and through said support in the center of said attachment points.

3. Apparatus as set forth in claim 1, wherein said means for attaching said rubber blanket to said support by applying vacuum thereto between said attachment points comprises a system of air channels in the upper surface of said support, which channels are connected to a source of subatmospheric pressure.

4. Apparatus as set forth in claim 1, wherein the printing frame is connected to a first source of subatmospheric pressure producing a relatively strong vacuum, while the means for attaching said rubber blanket to said support by vacuum is attached to a source of subatmospheric pressure producing a substantially weaker vacuum than said first source.

5. Apparatus as set forth in claim 4 wherein the means for attaching said collection film to the rubber blanket by vacuum are connected to a source of subatmospheric pressure producing a stronger vacuum than the vacuum producing source of subatmospheric pressure for attaching said blanket to said support.

6. Apparatus as set forth in claim 1, wherein said attachment points between said rubber blanket and said support are formed as a continuous attachment line extending along the periphery of said support.

7. Apparatus as set forth in claim 1, wherein said rubber blanket is porous and wherein said means for attaching said rubber blanket to said support by adhesive suction is at the same time effective to attach the collection film to the rubber blanket.

8. Apparatus as set forth in claim 6, wherein said means for attaching the collection film to said rubber blanket comprises vacuum sockets attached to the lower surface of the rubber blanket and provided with a bore extending through said rubber blanket and being freely movable in relation to said support.

* * * * *